US012668215B2

(12) United States Patent
Eckert

(10) Patent No.: US 12,668,215 B2
(45) Date of Patent: Jun. 30, 2026

(54) METHOD FOR OPERATING A VEHICLE COMBINATION

(71) Applicant: ZF CV Systems Europe BV, Brussels (BE)

(72) Inventor: Horst Eckert, Rehburg-Loccum (DE)

(73) Assignee: ZF CV Systems Europe BV, Brussels (BE)

( * ) Notice: Subject to any disclaimer, the term of this patent is extended or adjusted under 35 U.S.C. 154(b) by 74 days.

(21) Appl. No.: 18/587,179

(22) Filed: Feb. 26, 2024

(65) Prior Publication Data

US 2024/0198981 A1      Jun. 20, 2024

Related U.S. Application Data

(63) Continuation of application No. PCT/EP2022/071545, filed on Aug. 1, 2022.

(30) Foreign Application Priority Data

Aug. 24, 2021    (DE) .................... 10 2021 121 831.4

(51) Int. Cl.
*B60T 7/20*              (2006.01)
(52) U.S. Cl.
CPC ............. *B60T 7/20* (2013.01); *B60T 2201/02* (2013.01)
(58) Field of Classification Search
CPC ........ B60T 7/20; B60T 2201/02; B60T 17/22; B60T 2270/40; B60T 13/683; B60T 13/263
See application file for complete search history.

(56) References Cited

U.S. PATENT DOCUMENTS

2010/0063702 A1* 3/2010 Sabelstrom ............... B60T 8/24
                                                                    701/70
2010/0217495 A1   8/2010 Heise et al.
                         (Continued)

FOREIGN PATENT DOCUMENTS

DE      10 2008 009 043 B3    5/2009
DE      10 2009 008 342 A1    9/2010
                  (Continued)

OTHER PUBLICATIONS

Machine Translation of JP 2002266673 A PDF File Name"JP2002266673A_Machine_Translation.pdf" (Year: 2002).*
                  (Continued)

*Primary Examiner* — Grant Moubry
*Assistant Examiner* — Ruben Picon-Feliciano
(74) *Attorney, Agent, or Firm* — Walter Ottesen, P.A.

(57)                    ABSTRACT

A method is for operating a vehicle combination having a tractor and at least one trailer. A brake control unit of a tractor brake system monitors the braking behavior of the tractor or the vehicle combination, and if necessary the brake pressure at each of the wheel brakes of the tractor, and initiates the deceleration of the trailer. To improve the driving safety of the vehicle in the event of limitation of the functionality of components of the vehicle combination, at least one vehicle component of the tractor and/or of the trailer, the vehicle component being relevant for driving safety, is monitored with regard to functionality, and in the event of detection of a limitation of the functionality of a component, the brake control unit of the tractor brake system decelerates the vehicle combination using a trailer brake system of the trailer.

13 Claims, 2 Drawing Sheets

(56)  References Cited

U.S. PATENT DOCUMENTS

| | | | | |
|---|---|---|---|---|
| 2010/0292898 | A1 | 11/2010 | Stoehr | |
| 2018/0354478 | A1 | 12/2018 | Eckert | |
| 2019/0248346 | A1* | 8/2019 | Wulf | B60T 7/20 |
| 2019/0315324 | A1 | 10/2019 | Eckert | |
| 2020/0139952 | A1 | 5/2020 | Van Thiel | |
| 2020/0160723 | A1* | 5/2020 | Switkes | G05D 1/0027 |
| 2021/0370898 | A1 | 12/2021 | Eckert | |
| 2022/0089137 | A1 | 3/2022 | Michaelsen et al. | |
| 2022/0144232 | A1 | 5/2022 | Van Thiel | |

FOREIGN PATENT DOCUMENTS

| | | | | |
|---|---|---|---|---|
| DE | 10 2011 089 534 | A1 | 3/2013 | |
| DE | 10 2015 112 754 | A1 | 2/2017 | |
| DE | 10 2016 013 054 | A1 | 6/2017 | |
| DE | 10 2016 010 461 | A1 | 3/2018 | |
| DE | 102016012925 | A1 * | 5/2018 | B60T 8/323 |
| DE | 10 2017 005 979 | A1 | 9/2018 | |
| DE | 10 2018 127 088 | A1 | 4/2020 | |
| DE | 10 2019 106 274 | A1 | 9/2020 | |
| DE | 10 2019 106 591 | A1 | 9/2020 | |
| JP | 2002266673 | A * | 9/2002 | |

OTHER PUBLICATIONS

Machine Translation of DE102016012925A1 PDF File Name: "DE102016012925A1_Machine_Translation.pdf" (Year: 2018).*

English translation and Written Opinion of the International Searching Authority dated Jan. 19, 2023 for international application PCT/EP2022/071545 on which this application is based.

International Search Report of the European Patent Office dated Jan. 19, 2023 for international application PCT/EP2022/071545 on which this application is based.

* cited by examiner

METHOD FOR OPERATING A VEHICLE COMBINATION

CROSS-REFERENCE TO RELATED APPLICATIONS

This application is a continuation application of international patent application PCT/EP2022/071545, filed Aug. 1, 2022, designating the United States and claiming priority from German application 10 2021 121 831.4, filed Aug. 24, 2021, and the entire content of both applications is incorporated herein by reference.

TECHNICAL FIELD

The disclosure relates to a method for operating a vehicle combination having a tractor vehicle and having at least one trailer vehicle having an anti-lock brake system.

BACKGROUND

The tractor vehicle and the at least one trailer vehicle of the vehicle combination have pneumatically actuatable wheel brakes at each wheel. The wheel brakes of such service brake systems are adjustable in terms of their braking action by way of the brake pressure that is set. The tractor vehicle brake system has an electronic brake control unit that monitors the braking behavior of the tractor vehicle or of the vehicle combination as a whole. The brake control unit is configured to adjust the brake pressure at each of the wheel brakes of the tractor vehicle and to adjust a trailer brake pressure with which a trailer brake system of a relevant trailer vehicle is controlled in open-loop or closed-loop fashion in terms of its braking action. Here, the brake control unit varies the brake pressure and/or the trailer brake pressure as required, irrespective of the inputs made by a driver of the vehicle combination. In so doing, the brake control unit implements an anti-lock brake system (ABS) for the tractor vehicle, and adjusts the brake pressure if there is a locking tendency at particular wheels. Specifically, only a braking force corresponding to the friction coefficient of the roadway can be utilized during any braking operation. If the braking force that is input exceeds the maximum braking force that is transmissible at one or more wheels, the wheels begin to lock, which can cause the vehicle to become unstable. An ABS system permanently monitors the rotational speed of each wheel on the basis of measurement signals from rotational speed sensors, and from these ascertains the respective brake slip values. This may be performed for example by comparing the wheel speed that is ascertained from the wheel rotational speed with a vehicle reference speed that is ascertained from all of the wheel speeds of the vehicle. If a locking tendency of the wheel is identified from the brake slip value thus ascertained, that is, if a slip limit has been reached or overshot, the brake control unit performs control by adjusting the brake pressure. Here, in a first step, the brake pressure is lowered in order to subsequently adjust the brake pressure of the relevant wheel along the slip limit by closed-loop control. The braking moment is increased again until such time as a braking moment that corresponds to the friction coefficient of the roadway is reached.

US 2018/0354478 and US 2019/0315324 disclose a method for adjusting brake pressures at pneumatically actuatable wheel brakes of a vehicle combination, wherein a tractor vehicle brake system has a brake control unit, and a trailer brake system has a separate anti-lock brake system with its own brake electronics unit.

In the known method, the brake control unit of the tractor vehicle brake system communicates with the brake electronics unit of the trailer brake system and receives information relating to the brake slip value of each axle unit of the trailer vehicle. If it is apparent from the evaluation of the brake slip value that there is a demand for braking at the trailer vehicle, the brake control unit of the tractor vehicle outputs a corresponding trailer brake pressure that is provided to the trailer vehicle at a trailer control valve of the tractor vehicle.

US 2021/0370898 discloses a further method in which the brake control unit of the tractor vehicle brake system communicates with a brake electronics unit of the trailer brake system in order to receive brake slip information. If the driver actuates the brake pedal and thus the service brake valve, the brake control unit of the tractor vehicle brake system detects the setpoint deceleration determined by the driver and also the present actual deceleration of the vehicle combination. The actual deceleration of the vehicle combination is adjusted to the setpoint deceleration through coordinated actuation of the service brake systems, that is, of the tractor vehicle brake system and of the trailer vehicle brake system.

Electrical, electronic or mechanical faults at a wheel, at a brake or at other vehicle components or systems that are relevant for the driving safety of the vehicle may occur during travel of the vehicle combination. If the driver does not notice the fault and/or the associated limitations in functionality of the vehicle component in question, unchanged onward travel of the vehicle combination could pose a considerable risk to the driving safety of the vehicle combination and/or of other road users.

SUMMARY

It is an object of the present disclosure to improve the driving safety of the vehicle in the event of limitation of the functionality of vehicle components of the vehicle combination.

According to the disclosure, the above object is, for example, achieved by a method for operating a vehicle combination having a tractor vehicle and having at least one trailer vehicle, wherein a brake control unit of a tractor vehicle brake system monitors a braking behavior of the tractor vehicle or of the vehicle combination, and, if necessary, initiates a respective brake pressure at each of a plurality of wheel brakes as well as a deceleration of the trailer vehicle. The method includes: monitoring at least one vehicle component of at least one of the tractor vehicle and the trailer vehicle with regard to a functionality thereof, wherein the at least one vehicle component is relevant for driving safety; and, decelerating the vehicle combination via the brake control using a trailer brake system of the trailer vehicle in an event of a detection of a limitation of the functionality of a vehicle component.

According to the disclosure, at least one vehicle component of the tractor vehicle and/or of the trailer vehicle, the vehicle component being determined as being relevant for the driving safety of the vehicle and thus also of the vehicle combination, is monitored with regard to its functionality, and in the event of detection of a limitation of the functionality of a vehicle component, the brake control unit of the tractor vehicle brake system decelerates the vehicle combination using a trailer brake system 4 of the trailer vehicle 6. If a limitation of the functionality of a vehicle component occurs which is relevant for the driving safety of the vehicle, the brake control unit of the tractor vehicle initiates a deceleration of the trailer vehicle, in order to reduce the speed of the vehicle combination, irrespective of the driving behavior of the driver. The braking of the trailer vehicle (and not of the tractor vehicle situated ahead of it in the vehicle combination) has the advantage that the vehicle combination is straightened during the deceleration maneuver. This also rules out a situation in which, in the event of a limitation of the functionality of a vehicle component of the tractor vehicle, the driving safety of the vehicle is possibly yet further adversely affected by an initiation of a braking operation for decelerating the vehicle by activation both of the brake system of the tractor vehicle and of the at least one trailer vehicle.

The disclosure relates both to vehicle combinations with trailer vehicles that are towed using drawbars and to semi-trailer trucks in which a tractor vehicle tows the semitrailer.

The vehicle combination is advantageously decelerated by virtue of the brake control unit of the tractor vehicle brake system adjusting a trailer brake pressure with which the trailer brake system of the trailer vehicle is controlled in open-loop or closed-loop fashion in terms of its braking action.

In the case of a vehicle combination with an electronic brake system (EBS), the brake control unit of the tractor vehicle commands a brake electronics unit of a trailer vehicle, by way of a message with continuously updated message content, to brake the trailer vehicle in accordance with the message.

In an embodiment, following detection of a functional limitation of a vehicle component, closed-loop control of a maximum speed ascertained or specified for this situation is performed by the brake control unit through adjustment of the trailer brake pressure. In other words, the adjustable trailer brake pressure is the manipulated variable in a closed control loop, the controlled variable of which is the driving speed of the vehicle combination. Through influencing of the trailer brake pressure, the driving speed of the vehicle combination is influenced such that the driving speed is approximated to the ascertained or specified maximum speed, that is, the maximum speed that is reduced in relation to the present driving speed is adopted.

The value of the maximum speed that is set by closed-loop control by way of the trailer brake pressure is adapted to the quality of the affected vehicle component and/or to the degree of impairment of the functionality. Here, the vehicle speed may be reduced to a standstill, or to a maximum speed that may be continuously updated. Not only specifications relating to typically occurring faults but also the present driving demands of the driver, specifically an acceleration or braking demand of the driver, may be taken into consideration in an ascertainment of the maximum speed.

The adjustment of the driving speed to a maximum speed by closed-loop control can advantageously be activated by the driver, such that the driver can make the decision to at least temporarily continue the journey at a reduced driving speed. A corresponding actuating device for activating the adjustment to the maximum speed by closed-loop control is arranged in the area of the driver's seat. The adjustment of the driving speed to a maximum speed by closed-loop control can advantageously be activated by actuation of the accelerator pedal, such that an existing device can be used for activating the closed-loop control. For example, if the driver actuates the accelerator pedal as far as a stop, the vehicle combination is not brought to a standstill but is adjusted by closed-loop control to a particular maximum speed, the magnitude of which is adapted to the detected functional limitation or to the detected fault and/or identified driving situation.

In an embodiment of the disclosure, the maximum speed can be increased by—possibly repeated—actuation of the accelerator pedal, such that higher driving speeds are available for the driver to choose in accordance with their assessment of the hazard situation. For example, if the driver actuates the accelerator pedal several times in close succession as far as the stop, which indicates the activation of the closed-loop control of the driving speed, the setpoint variable (maximum speed) is selected by the driver in accordance with this and is set by closed-loop control by way of the trailer brake pressure.

As soon as the closed-loop control of the trailer brake pressure has commenced and brake pressure has been actively provided at the trailer brake system, an information signal is advantageously output from the control unit to an engine control unit with the message that the engine should no longer generate drive torque.

It is advantageously the case that, for the detection of a functional limitation of a vehicle component, the rotational speeds of the wheels are monitored. No additional measuring devices are necessary for the required information if the component vehicles in question of the vehicle combination are equipped with anti-lock brake systems. For the detection of the functionality of each wheel, the measured values detected by the anti-lock brake system for the rotational speed of the wheel are taken into consideration. This embodiment of the disclosure is therefore particularly advantageous in the case of vehicle combinations with trailer vehicles that are equipped with a dedicated anti-lock brake system. Here, the anti-lock brake system of the trailer vehicle—in particular the brake electronics unit thereof—provides the wheel rotational speed information that is desired for the monitoring of the functionality of the vehicle components in accordance with the disclosure.

A particular functional impairment can be inferred from a conspicuous value of the rotational speed of a wheel, that is, a rotational speed that is conspicuous in relation to other wheels of the vehicle, in the presence of certain attendant circumstances. For example, during unbraked travel of the vehicle, the decrease of a wheel rotational speed points toward the impediment of the free rotation of the wheel, which is an indication of permanently grinding brake pads of the brake or of some other damage to brake components at the wheel. In particular in the case of permanent grinding of the brake pads, there is the risk that brake components can overheat, often very quickly, in a manner that damages the brake. As a result of the driving speed being reduced in accordance with the disclosure, by adjustment or increase of the trailer brake pressure and subsequent adjustment of the driving speed by closed-loop control to a maximum speed, the occurrence of damage that goes unnoticed by the driver is counteracted.

During braked travel of the vehicle, a wheel is conspicuous in terms of its measured rotational speed if the rotational speed indicates no brake slip or only very little brake slip of the wheel, that is, the wheel is not contributing, or is contributing only abnormally little, according to the setpoint deceleration, to the work being done to decelerate the vehicle. This behavior is an indication of a malfunction of a component of the wheel brake between the point at which pressure is fed into the brake cylinder and the brake friction surface/brake pad as brake components of the brake, for example a broken brake line. In particular if the conspicuous rotational speed occurs at one wheel (or both wheels) of the front axle, this constitutes a malfunction that is critical in terms of driving safety. Following detection of the malfunction, the brake control unit of the tractor vehicle brake system automatically reduces the driving speed of the vehicle combination, irrespective of the driving behavior of the driver, through corresponding adjustment of the trailer brake pressure to the maximum speed that is intended for this functional limitation.

If one wheel of the vehicle combination is permanently locked, or is locked several times in close succession, without the driver or an external brake system (driver assistance system) performing a braking operation, then the monitoring of the functionality can infer that a limitation is present owing to a mechanical fault. For example, in drum brakes, it is often then the case that the S-shaped cam that pushes the brake shoes apart and against the brake drum has turned too far owing to an incorrect readjustment of the air gap between brake drum and brake shoes.

A severe impediment of a wheel that is detected through monitoring of the wheel rotational speed may also indicate sudden bearing damage.

In a further embodiment, for the detection of a functional limitation of a vehicle component, the tire pressure of vehicle wheels is monitored. If a suddenly or quickly decreasing tire pressure is detected during the monitoring of the tire pressure, this is evaluated as a state which poses a risk to the driving safety of the vehicle combination, and a deceleration of the vehicle combination in accordance with the disclosure is initiated. This is advantageous in particular if the wheel affected by the detected pressure loss is a steered wheel, generally a front wheel. The braking of the vehicle combination by way of a trailer vehicle causes the vehicle combination to be straightened, and the tractor vehicle situated at the front remains steerable.

In a further embodiment, for the detection of a functional limitation of a vehicle component, the functionality of electrical connections between tractor vehicle and trailer vehicle is monitored. In the event of a fault or an interruption of the electrical connection, which often cannot be noticed by the driver, the trailer brake pressure is automatically increased and the trailer vehicle is decelerated, wherein the driver is also made aware, by the automatic deceleration, that a functional limitation has been detected.

It can advantageously be the case that, for the detection of a functional limitation of a vehicle component, the functionalities of axle suspension arrangements are monitored. Here, through evaluation of the measurement signal of an axle load sensor, damage to the spring elements, for example to a leaf spring, can be indirectly identified. In the case of an axle with air suspension, the functionality of a pneumatic support bellows, for example, is monitored. Through evaluation of the measurement signal from a pressure sensor of the support bellows, specified situations that are associated with a limitation of the functionality are identified, and the brake control unit of the tractor vehicle brake system thus decelerates the vehicle combination in accordance with the disclosure by correspondingly adjusting the trailer brake pressure.

In a further embodiment, for the detection of a functional limitation of a vehicle component, the functionality of the steering system of the tractor vehicle is monitored. According to the disclosure, if a functional limitation that is of significance for the driving safety of the vehicle is ascertained through evaluation of the measurement signals from the rotational speed sensors of the wheels of the tractor vehicle, in particular those of the front axle (steering axle) of the tractor vehicle, of the measurement signal from a steering wheel angle sensor (LWS), of the measurement signals from axle load sensors of the front axle and/or of a signal from a lane keeping assistance system (LDW, LDWS, AFIL, LKAS), the vehicle combination is decelerated by corresponding adjustment of the trailer brake pressure, determination of a maximum speed, and subsequent adjustment of the driving speed to the maximum speed by closed-loop control.

In a further embodiment, for the detection of a functional limitation of a vehicle component, the functionality of the wheel brakes (friction brakes) of the tractor vehicle is monitored. An evaluation of the measurement signals from the rotational speed sensors of the wheels of the tractor vehicle, and information relating to the mass of the tractor vehicle and of the trailer vehicle and/or relating to the setpoint deceleration determined by the driver, are taken into consideration in the monitoring for detecting damage to the wheel brakes of the tractor vehicle. The mass of the tractor vehicle can be ascertained for example via axle load sensors of the tractor vehicle, and the mass of the trailer vehicle can be ascertained indirectly by ascertainment of the mass of the vehicle combination and the mass of the tractor vehicle, wherein the mass of the tractor vehicle is subtracted from the ascertained mass of the vehicle combination. The mass of the vehicle combination is ascertained from data relating to the drive power of the vehicle (vehicle combination), the data being obtained from an engine control unit and being ascertained by the engine control unit during phases of positive acceleration of the vehicle, and simultaneously detected vehicle speed data. According to the disclosure, if it is ascertained that, during travel with high capacity utilization (loading) of the tractor vehicle and with the capacity of the trailer vehicle not being fully utilized, the braking action of the wheel brakes of the tractor vehicle, which decelerates the vehicle combination, exhibits a strongly progressive decrease depending on the setpoint deceleration specified by the driver, the vehicle combination is decelerated by corresponding adjustment of the trailer brake pressure, determination of a maximum speed, and subsequent adjustment of the driving speed to the maximum speed by closed-loop control. In this way, so-called brake fading is counteracted, in the case of which a functional impairment of the wheel brakes that is of significance for the driving safety of the vehicle is present immediately following an intense conversion of kinetic energy into thermal energy by the wheel brakes, for example following a relatively long period of downhill travel and/or several successive, relatively intense braking operations starting from relatively high driving speeds.

BRIEF DESCRIPTION OF DRAWINGS

The invention will now be described with reference to the drawings wherein.

DETAILED DESCRIPTION

Figure 1:
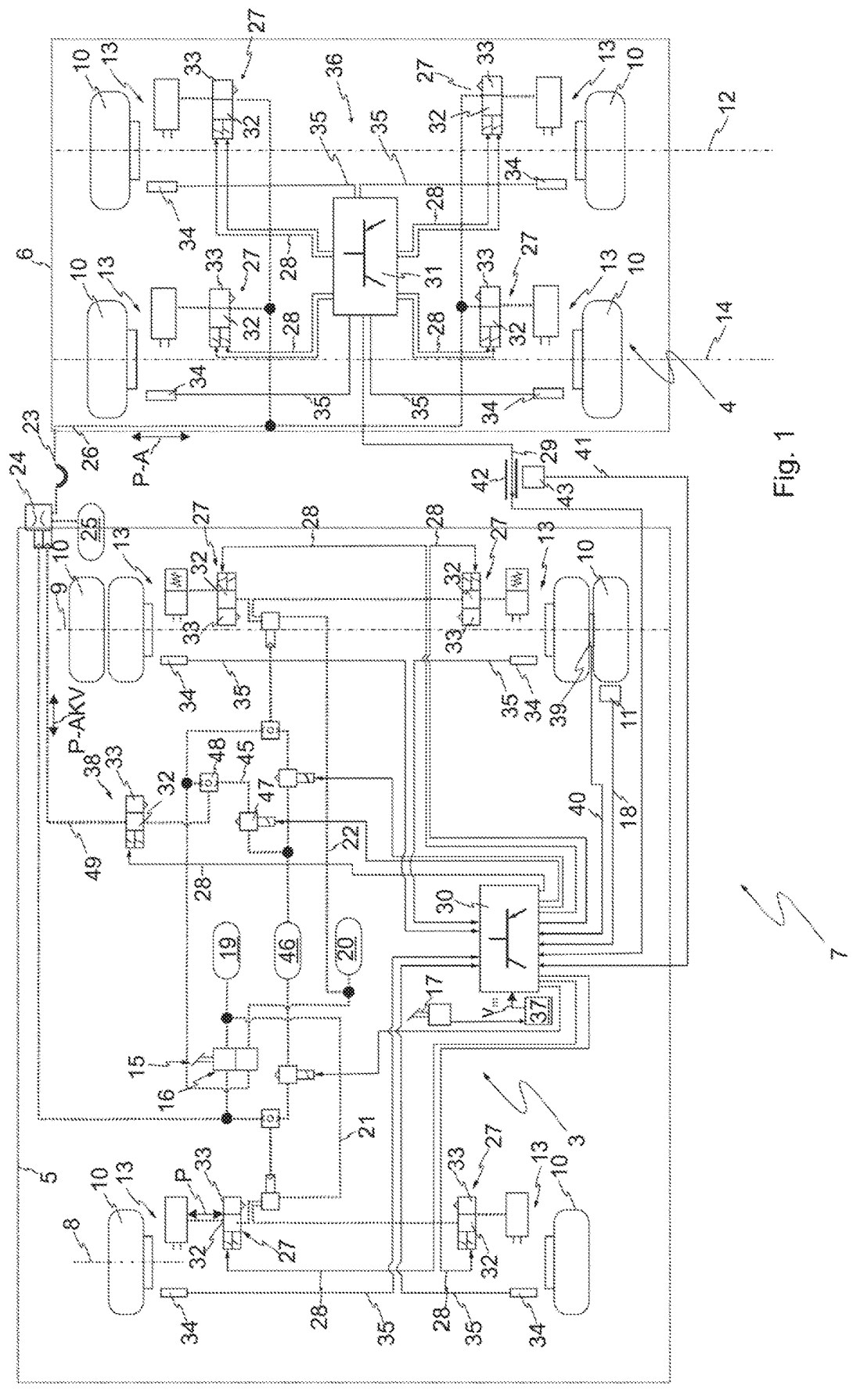
FIG. 1 shows a pneumatic and electrical diagram of the brake systems of a vehicle combination having a tractor vehicle and a trailer vehicle; and, FIG. 2 shows a flow diagram of an embodiment of a method for operating the vehicle combination according to FIG. 1.

FIG. 1 shows an electrical and pneumatic diagram of the brake systems of a vehicle combination, specifically of the tractor vehicle brake system 3 of a tractor vehicle 5 of the vehicle combination 7 and of a trailer brake system 4 of a trailer vehicle 6. In the diagram, electrical lines are illustrated using solid lines, and pneumatic lines are illustrated using dotted lines. In the embodiment shown, the tractor vehicle 5 comprises two axles 8, 9, with wheels 10 being arranged on both sides at each of the axles. The trailer vehicle 6 likewise has two trailer axles 12, 14, each having wheels 10. To brake the wheels 10, each wheel 10 is assigned a pneumatically actuatable wheel brake 13, the wheel brakes being parts of the relevant service brake system of a vehicle of the vehicle combination 7.

In the driver's cab of the tractor vehicle 5, there are arranged an accelerator pedal 17 and a brake pedal 15, the brake pedal being coupled to a service brake valve 16. By actuating the brake pedal 15, the driver of the tractor vehicle 5 can open pneumatic brake lines between pressure medium reservoirs 19, 20 and the wheel brakes 13. Via the accelerator pedal 17, the driver adjusts the driving speed of the vehicle combination 7.

In the embodiment shown, the wheel brakes 13 of the front axle 8 of the tractor vehicle 5 are assigned to a common first brake circuit 21, whereas the wheel brakes 13 of the rear axle 9 can be actuated via a second brake circuit 22. The first pressure medium reservoir 19 is in this case assigned to the first brake circuit 21. The second brake circuit 22 of the rear axle 9 is supplied with pressure medium via a second pressure medium reservoir 20. The second brake circuit 22 is constructed analogously to the first brake circuit 21.

Both in the tractor vehicle brake system 3 and in the trailer brake system 4, a pressure control valve 27 is connected upstream of each wheel brake 13, each of which pressure control valves is electrically actuatable. To receive control signals 28, the pressure control valves 27 of the tractor vehicle brake system 3 are connected to a brake control unit 30. The pressure control valves 27 of the trailer brake system 4 are connected to a brake electronics unit 31. The pressure control valves 27 are each a combination of at least two solenoid valves, specifically an inlet valve 32 and an outlet valve 33. The inlet valve 32 serves in principle for increasing brake pressure or, by being closed, for maintaining the brake pressure P at a wheel brake 13 of a wheel 10, whereas, in order to reduce the brake pressure P, the outlet valve 33 is opened and the brake cylinder, respectively connected on the wheel side, of the wheel brake 13 of a wheel 10 is ventilated. The inlet valve 32 and the outlet valve 33 of the pressure control valves 27 are preferably 2/2 directional valves.

The brake control unit 30 and the brake electronics unit 31 are configured and provided for influencing the brake pressure in the relevant component vehicle of the vehicle combination 7 as required. For this purpose, the rotational behavior of the respective wheels 10 is monitored. Each wheel 10 of the tractor vehicle 5 and each wheel 10 of the trailer vehicle 6 is assigned a rotational speed sensor 34 that generates measurement signals 35 providing information regarding the rotational behavior of the relevant wheel 10. The rotational speed sensors 34 of the tractor vehicle brake system 3 are connected to the brake control unit 30, and the rotational speed sensors 34 of the trailer brake system 4 are connected to the brake electronics unit 31. The brake control unit 30 and the brake electronics unit 31 evaluate the measurement signals 35 from the respectively connected rotational speed sensors 34.

The brake electronics unit 31, the rotational speed sensors 34 and the pressure control valves 27 of the trailer brake system 4 are the main elements of an anti-lock brake system 36 of the trailer vehicle 6. Irrespective of an anti-lock brake function (ABS) of the brake control unit 30 of the tractor vehicle 5, the brake electronics unit 31 monitors the locking tendency of the individual wheels 10 of the trailer vehicle 6 by way of the rotational speed sensors 34 or by evaluating the measurement signals 35 from the rotational speed sensors. If a locking tendency of a wheel 10 is identified, the brake electronics unit 31 counteracts locking of the wheels 10 by actuating the one or more pressure control valves 27 and by adjusting the brake pressures prevailing at the wheel brakes along the slip limit by closed-loop control.

The tractor vehicle brake system 3 comprises a coupling head 23 to which the trailer brake system 4 of the trailer vehicle 6 can be coupled. Via the coupling head 23, the tractor vehicle brake system 3 provides a pneumatic trailer brake pressure P-A for the trailer brake system 4. The coupling head 23 is assigned a trailer control valve 24 that controls the connection between a third pressure medium reservoir 25 and the pneumatic coupling head 23. The trailer brake system 4 has a trailer brake circuit 26, in which the trailer brake pressure P-A prevails and can be connected through to all wheel brakes 13 of the trailer brake system 4. The actuation of the trailer control valve 24 is performed by actuation of the service brake valve 16 by the driver using the brake pedal 15, or is performed by the brake control unit 30 of the tractor vehicle brake system 3 irrespective of actuation of the service brake valve 16 by the driver. For this purpose, the tractor vehicle brake system 3 has a trailer pressure control valve 38 which is actuatable by the brake control unit 30 of the tractor vehicle brake system 3 and which is constructed analogously to the pressure control valves 27 connected upstream of the wheel brakes 13. The inlet valve 32 and the outlet valve 33 of the trailer pressure control valve 38 are actuated by the brake control unit 30 of the tractor vehicle brake system 3. For this purpose, the tractor vehicle brake system 3 has a fourth brake circuit 45 with a separate fourth pressure medium reservoir 46. The fourth brake circuit 45 has a 3/2 directional valve 47, a double check valve 48 and a trailer pressure control valve 38, which is constructed analogously to the pressure control valves 27 of the wheel brakes 13, and the inlet valve 32 and outlet valve 33 of which are actuated by the brake control unit 30 of the tractor vehicle brake system 3 by way of control signals 28. The control signals 28 give rise to a control brake pressure P-AKV in the brake pressure line 49 to the trailer control valve 24, which control brake pressure causes the trailer control valve 24 to provide a trailer brake pressure P-A to the trailer brake system 4 of the trailer vehicle 6.

As will be discussed in more detail further below with reference to FIG. 2, vehicle components of the tractor vehicle 5 and of the trailer vehicle 6 that are determined as being relevant for driving safety are monitored with regard to their functionality. If a vehicle component of the vehicle combination 7 is impaired in terms of its functionality, the brake control unit 30 decelerates the driving speed of the vehicle combination 7 by correspondingly adjusting the trailer brake pressure P-A, and for this purpose actuates the trailer pressure control valve 38.

In the present embodiment, the functionality of wheels 10, wheel brakes 13, axle suspension arrangements 39 and electrical connections 42 between tractor vehicle 5 and trailer vehicle 6 are monitored. For this purpose, the measurement signals 35 from the wheel rotational speed sensors 34 of the wheels 10 are taken into consideration, and the rotational speed n of the respective wheels 10 is evaluated with regard to functional impairment of the wheels 10 themselves and/or of the respectively associated wheel brakes 13. Furthermore, each of the wheels 10 is assigned a tire pressure sensor 11, the measurement signal 18 of which, with information relating to the tire pressure R, is evaluated in order to monitor the tire pressure R. The functionality of axle suspension arrangements 39 is also monitored. For this purpose, the respectively monitored axle 9 is assigned a corresponding measuring device, the measurement signal 40 from which is evaluated. Here, the monitoring of functionality may be performed at selected wheels 10 or axles 9, or at all wheels 10 or axles 8, 9, of the tractor vehicle 5 or of the vehicle combination 7. Finally, in the embodiment shown, the functionality of the electrical connection 42 between the tractor vehicle 5 and the trailer vehicle 6 is monitored by evaluation of the measurement signal 41 of a measuring device 43 that is assigned to the electrical connection.

The brake control unit 30 of the tractor vehicle brake system 3 and the brake electronics unit 31 of the trailer brake system 4 communicate with one another via an electrical connection 42 between the vehicles (component vehicles) of the vehicle combination 7. Monitoring information relating to the trailer vehicle 6 is made available in the tractor vehicle 5 via the connection 42, the information being transmitted by way of an information signal 29. The information signal 29 contains information relating to the trailer brake system 4, including information relating for example to the rotational speeds of the wheels 10 of the trailer vehicle 6 or the slip of each of the wheels, as evaluated by the anti-lock brake system 36 of the trailer vehicle 6. The information from the anti-lock brake system 36 of the trailer vehicle 6 is evaluated by the brake control unit 30 of the tractor vehicle 5 for braking force distribution purposes or for the purposes of being input into driver assistance systems. The information signal 29 from the trailer vehicle 6 is at the same time used for the purposes of monitoring the functionality of vehicle components of the trailer vehicle 6 in accordance with the disclosure.

Figure 2:
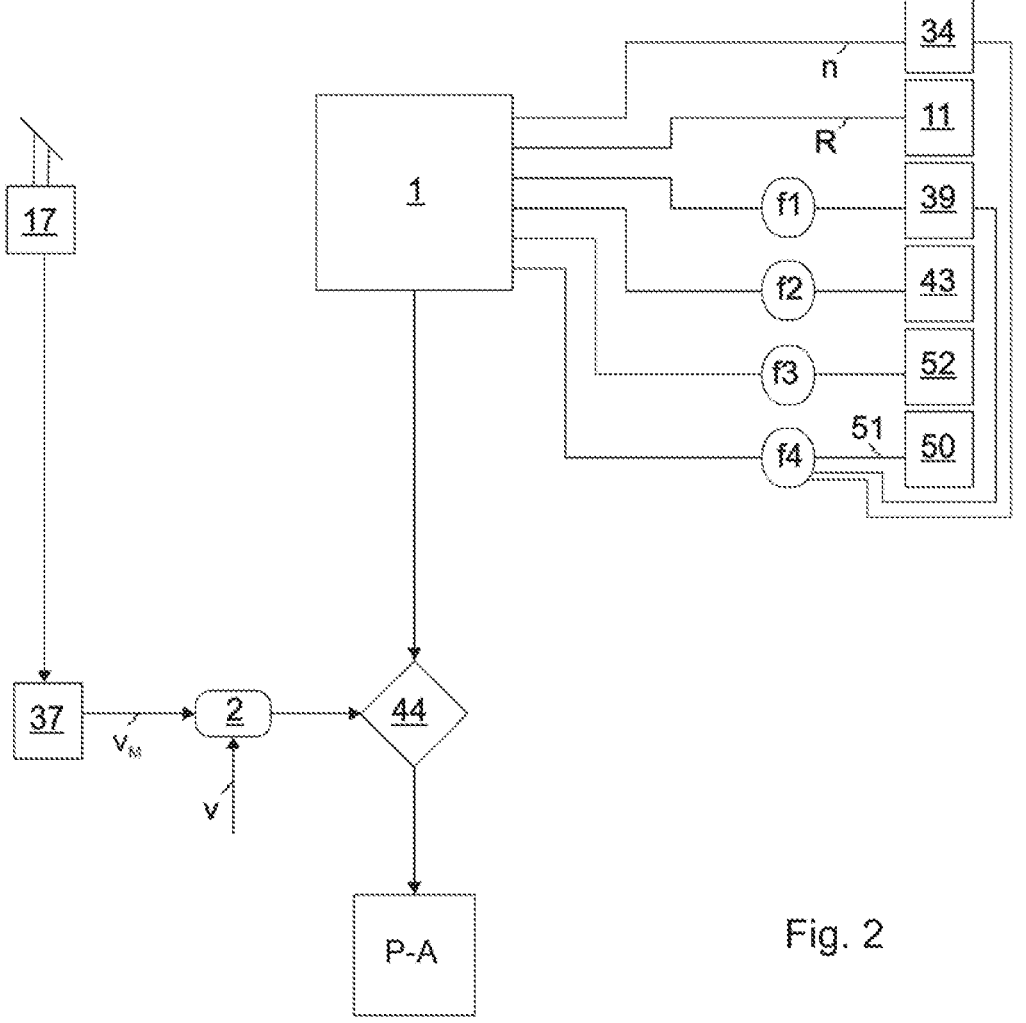

The deceleration of the vehicle combination 7 in the event of detection 1 of an impairment of functionality of a vehicle component that is relevant for driving safety is illustrated in FIG. 2. In the embodiment shown, the wheel rotational speeds n are evaluated by way of the measurement signals 35 from the rotational speed sensors 34, the tire pressures R at the wheels 10 are evaluated by way of the measurement signals 18 from the respective tire pressure sensors 11, the measurement signals 40 from the measuring devices at the axle suspension arrangements 39 are evaluated, giving information relating to the functionality f1 of the axle suspension arrangement, and the measurement signal 41 from the measuring device 43 at the electrical connection 42 between tractor vehicle 5 and trailer vehicle 6 is evaluated for the purposes of detecting the functionality f2 of the electrical connection 42.

The functionality f3 of the steering system of the tractor vehicle is also monitored. For this purpose, the detection 1 detects the measurement signal from a steering wheel angle sensor 52.

Taking into consideration the measurement signals 35 from the rotational speed sensors 34, the measurement signals 40 from the measuring devices at the axle suspension arrangements 39, and data from an engine control unit 50 relating to the drive power of the engine, in order to ascertain vehicle masses, the functionality f4 of the wheel brakes of the tractor vehicle is also monitored. For the detection of the functionality f4 of the wheel brakes, the engine control unit 50 provides an information signal 51 to the brake control unit, which information signal communicates the present drive power of the engine and, with this variable, allows the mass of the tractor vehicle to be ascertained. A rapid diminishment of the braking action of the wheel brakes of the tractor vehicle, so-called fading, can thus be identified. In such a situation, if it is ascertained that a load of the tractor vehicle is high and that the trailer vehicle is not fully laden, the onset of critical driving situations can be prevented by decelerating the vehicle combination by way of the trailer vehicle.

If it is apparent from the detection 1 that the functionality of a vehicle component is impaired, a deceleration of the vehicle combination 7 is initiated by adjustment 44 of a corresponding trailer brake pressure P-A in accordance with the identified nature and severity of the functional impairment. At the same time as the adjustment of a trailer brake pressure P-A, an information signal is output from the brake control unit 30 to an engine control unit, the content of which information signal stipulates that, temporarily, for as long as the information signal is present, no power that drives the vehicle is to be generated by the drive engine (engine).

The adjustment of the trailer brake pressure P-A and the associated deceleration of the vehicle combination 7 by braking of the trailer vehicle 6 can be influenced by the driver of the vehicle combination 7 by actuation of the accelerator pedal 17 in a specified manner, for example by brief depression of the accelerator pedal 17 as far as a stop. In this case, a maximum speed vM can be specified for closed-loop control 2 and controlled in closed-loop fashion through the adjustment 44 of the trailer brake pressure P-A. For this purpose, the present driving speed v is taken into consideration, and if a driving speed v is higher than the maximum speed vM, a deceleration by way of the trailer brake pressure P-A is initiated. The adjustment of the driving speed v by closed-loop control 2 to a maximum speed vM can be activated by actuation of the accelerator pedal 17. The value of the specified maximum speed vM is obtained from a characteristic map memory 37 in which advantageous empirical values for relevant situations of malfunctions, or functional limitations, of particular vehicle components are stored. The maximum speed vM is read out from the characteristic map memory 37 in accordance with the result of the detection 1.

The magnitude of the maximum speed vM is adapted to the functional limitation ascertained during the detection 1 or to the detected fault or identified driving situation (high-speed freeway travel). The specification of the maximum speed vM is increased by repeated actuation of the accelerator pedal 17, such that higher driving speeds are available for the driver to choose in accordance with their assessment of the hazard situation. Thus, if the driver actuates the accelerator pedal 17 several times in close succession, the setpoint variable (maximum speed) is selected by the driver in accordance with this and is set by closed-loop control by way of the trailer brake pressure P-A and the drive torque of the engine.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 Detection
2 Closed-loop control
3 Tractor vehicle brake system
4 Trailer vehicle brake system 5 Tractor vehicle
6 Trailer vehicle
7 Vehicle combination
8 Front axle
9 Rear axle
10 Wheel
11 Tire pressure sensor
12 Trailer axle, rear
13 Wheel brake
14 Trailer axle, front
15 Brake pedal
16 Service brake valve
17 Accelerator pedal
18 Measurement signal
19 First pressure medium reservoir
20 Second pressure medium reservoir
21 First brake circuit
22 Second brake circuit
23 Coupling head
24 Trailer control valve
25 Third pressure medium reservoir
26 Trailer brake circuit
27 Pressure control valve
28 Control signal
29 Information signal
30 Brake control unit
31 Brake electronics unit
32 Inlet valve
33 Outlet valve
34 Rotational speed sensor
35 Measurement signal
36 Anti-lock brake system (ABS)
37 Characteristic map memory
38 Trailer pressure control valve
39 Axle suspension arrangement
40 Measurement signal
41 Measurement signal
42 Electrical connection
43 Measuring device
44 Adjustment of trailer brake pressure
45 Fourth brake circuit
46 Fourth pressure medium reservoir
47 3/2 directional valve
48 Double check valve
49 Brake pressure line
50 Engine control unit
51 Information signal
52 Steering wheel angle sensor
P Brake pressure (of a wheel brake of the tractor vehicle)
P-A Trailer brake pressure
P-AKV Control brake pressure
VM Maximum speed
v Driving speed
n Rotational speed
R Tire pressure
f1 Functionality
f2 Functionality
f3 Functionality
f4 Functionality
The invention claimed is:

1. A method for operating a vehicle combination having a tractor vehicle and having at least one trailer vehicle, wherein a brake control unit of a tractor vehicle brake system monitors a braking behavior of the tractor vehicle or of the vehicle combination and is configured to initiate a respective brake pressure at each of a plurality of wheel brakes as well as a deceleration of the trailer vehicle, the method comprising:

monitoring at least one vehicle component of at least one of the tractor vehicle and the trailer vehicle with regard to a functionality thereof, wherein the at least one vehicle component is relevant for driving safety;

decelerating the vehicle combination via the brake control unit using a trailer brake system of the trailer vehicle in response to a detection of a limitation of the functionality of the at least one vehicle component; and, after detecting the limitation of the functionality of the at least one vehicle component, controlling, via the brake control unit, a determined maximum speed associated with the limitation of the functionality of the at least one vehicle component by adjusting the brake pressure at the plurality of wheel brakes of the trailer vehicle.

2. The method of claim 1, wherein the brake control unit of the tractor vehicle brake system adjusts a trailer brake pressure with which a braking action of the trailer brake system of the vehicle is controlled in open-loop or closed-loop fashion.

3. The method of claim 1, wherein the adjustment of the vehicle speed to the maximum speed by closed-loop control is activatable by a driver.

4. The method of claim 1, wherein the adjustment of the vehicle speed to the maximum speed by closed-loop control is activatable by actuation of an accelerator pedal.

5. The method of claim 1, wherein the maximum speed is increasable by repeated actuation of an accelerator pedal.

6. The method of claim 1, wherein, for the detection of the functional limitation of the vehicle component, the rotational speed of a wheel is monitored.

7. The method of claim 1, wherein, for the detection of the functional limitation of the vehicle component, a tire pressure of a vehicle wheel is monitored.

8. The method of claim 1, wherein, for the detection of the functional limitation of the vehicle component, the functionality of electrical connections between tractor vehicle and trailer vehicle is monitored.

9. The method of claim 1, wherein, for the detection of the functional limitation of the vehicle component, the functionality of an axle suspension arrangement is monitored.

10. The method of claim 1, wherein, for the detection of the functional limitation of the vehicle component, the functionality of a steering system of the tractor vehicle is monitored.

11. The method of claim 1, wherein, for the detection of a functional limitation of a vehicle component, the functionality of the plurality of wheel brakes of the tractor vehicle is monitored.

12. The method of claim 1, wherein the trailer brake system has an anti-lock brake system.

13. The method of claim 1, wherein the determined maximum speed is read from a characteristic map memory storing empirical values.

* * * * *